I. D. WARD & A. T. METCALF.
CLEANING DEVICE FOR WEATHER SCREENS OF MOTOR VEHICLES, &c.
APPLICATION FILED JAN. 17, 1912.

1,117,286.

Patented Nov. 17, 1914.

UNITED STATES PATENT OFFICE.

IRVINE DEARDEN WARD, OF HALIFAX, AND ALFRED TOWNLEY METCALF, OF BRADFORD, ENGLAND.

CLEANING DEVICE FOR WEATHER-SCREENS OF MOTOR-VEHICLES, &c.

1,117,286. Specification of Letters Patent. Patented Nov. 17, 1914.

Application filed January 17, 1912. Serial No. 671,603.

*To all whom it may concern:*

Be it known that we, IRVINE DEARDEN WARD, of Westbury, Skircoat Green, Halifax, in the county of York, England, and ALFRED TOWNLEY METCALF, of 174 Lister avenue, Bradford, in the county of York, England, have invented certain new and Improved Cleaning Devices for Weather-Screens of Motor-Vehicles, &c., of which the following description, wherein reference is made to the accompanying drawings, is a specification.

In connection with those motor cars and like road vehicles wherein a glass weather or wind screen is employed, through which the driver of the vehicle has to look in order that he may guide such vehicle, considerable inconvenience is caused during heavy rain or stormy weather with sleet, snow and the like, by reason of the driver's view being interfered with on account of his inability to see through said screen and the matter accumulated thereon. To provide means whereby any obstructing matter that falls upon said screen may be readily and quickly removed therefrom by said driver or those in attendance is the object of our present invention.

In order that our invention may be readily understood we have hereunto appended sheets of drawings illustrative thereof, to which, by figures and letters, reference is made in the following description.

Figure 1 is a front elevation of a weather screen for a motor car, having our improvements applied thereto. Fig. 2 is a sectional end elevation of parts shown by Fig. 1.

Similar letters and figures of reference indicate like parts in both views.

In the several drawings only the wind screen itself is illustrated, said screen being of one particular form, but it will be readily understood therefrom how our invention may be applied to other forms of wind screens and how modifications of our invention may be arranged without departing from the nature thereof.

To attain the object of our invention we make use of a bar $a$ the edge of which is provided with rubber, felt or other material (as a strip of rubber $b$ being inserted or cemented therein) to act as a scraper in the manner of what is commonly known as a "squeegee". This bar we arrange to be traversed over the wind screen $c$ preferably in a vertical direction. In the arrangement illustrated by Figs. 1 and 2 the bar $a$ is secured to laterally extended flanges formed on slides or bearings $d$ which engage flanged guiding parts $e$ fixed upon the framework of the weather screen $c$. Connected to the slides $d$ are chains $f$ which pass over pulleys $g$, these latter being fixed upon end portions of a shaft $g'$ (which may be tubular) which also has fixed upon it another intermediate pulley $h$ having flanges to guide the chain which takes over it. This chain $h'$ which takes over it has its inner end fixed thereto, while its other end extends over the guide pulley $k$ for an appropriate distance to enable a handle part $h^2$ to be secured thereto, the chain $h'$ being wound upon pulley $h$ in a direction opposite to the winding of chains on pulleys $g$. This handle part $h^2$ is arranged to engage the spring clip $h^3$ which will retain it when its chain is withdrawn from the pulley $h$ as shown by Fig. 2, in which position it will have raised the "squeegee" $a$, $b$ to its highest position where it will support same until the attendant removes said handle $h^2$ to allow said scraper or "squeegee" to descend by gravity. This descending of the "squeegee" has the effect of clearing the screen of all matter accumulated thereon. The guide pulley $k$ is made use of in order that when the chain $h'$ is moved during the operations of the "squeegee" into the position somewhat as shown in broken lines Fig. 2, the portion of chain $h'$ extending between the pulley $k$ and $h$ may be kept from contacting with the upper edge of the screen $c$.

The wind screen is shown as mounted in connection with a motor car having a cover or projecting part $m$ upon which the bearings 2 for the several pulleys and spring $h^3$ are fixed, but it will be seen that where a screen is employed supported solely from beneath, pulley and chains may be arranged upon and along the upper part and edge of same so as to support and allow the movements of the "squeegee" in the manner described. The term "chain" is employed for the sake of brevity, and is intended to include any equivalent flexible connection.

Such being the nature and object of our invention, what we claim is:—

A cleaning device of the character described comprising flanged guides, grooved slides mounted to reciprocate upon said guides and provided with laterally extended flanges, a cleaner bar having its ends secured to said flanges, a shaft having end pulleys, and an intermediate pulley, chains connecting said slides and said end pulleys, and means connected with the intermediate pulley for rotating the same.

In testimony whereof we have affixed our signatures in presence of two witnesses.

IRVINE DEARDEN WARD.
ALFRED TOWNLEY METCALF.

Witnesses:
 JOHN WHITEHEAD,
 CHARLES R. FELL.